(12) United States Patent
Sumiya

(10) Patent No.: US 10,071,516 B2
(45) Date of Patent: Sep. 11, 2018

(54) MOLD FOR MANUFACTURING REEL COMPONENT MEMBER, METHOD OF MANUFACTURING REEL COMPONENT MEMBER, AND METHOD OF MANUFACTURING REEL

(71) Applicant: FUJIFILM CORPORATION, Minato-ku, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 284 days.

(21) Appl. No.: 15/018,866

(22) Filed: Feb. 9, 2016

(65) Prior Publication Data
US 2016/0279848 A1 Sep. 29, 2016

(30) Foreign Application Priority Data

Mar. 27, 2015 (JP) ................................. 2015-066198

(51) Int. Cl.
*B29C 33/56* (2006.01)
*B29C 45/27* (2006.01)
(Continued)

(52) U.S. Cl.
CPC .......... *B29C 45/2708* (2013.01); *B29C 33/56* (2013.01); *B29C 45/0025* (2013.01);
(Continued)

(58) Field of Classification Search
CPC .................................................... B29C 33/56
See application file for complete search history.

(56) References Cited

U.S. PATENT DOCUMENTS

| 4,690,370 A | * | 9/1987 | Skinner | B29C 33/56 204/192.15 |
| 7,352,528 B2 | * | 4/2008 | Ejiri | G11B 5/627 360/134 |

(Continued)

FOREIGN PATENT DOCUMENTS

| JP | 2002-292694 A | 10/2002 |
| JP | 2003-30952 A | 1/2003 |

(Continued)

OTHER PUBLICATIONS

English language translation of the following: Office action dated Dec. 5, 2017 from the JPO in a Japanese patent application No. 2015-066198 corresponding to the instant patent application. This office action translation is submitted now in order to supplement the understanding of the cited reference which is being disclosed in the instant information Disclosure Statement.

*Primary Examiner* — Jill L Heitbrink
(74) *Attorney, Agent, or Firm* — Solaris Intellectual Property Group, PLLC

(57) ABSTRACT

A mold for manufacturing a reel component member, the mold comprises a hub formation portion configured to form a circular tube shaped hub; a flange formation portion configured to form a flange integrally provided at one end portion of the hub; a bottom plate formation portion configured to form a bottom plate that is provided with a ring shaped reel gear at the one end portion or another end portion of the hub and that includes a plurality of hole portions provided at equal intervals on the reel gear; a gate that is disposed further to a radial direction inside than a wall face of the hub formation portion that is configured to form an inner peripheral face of the hub; and an anticorrosion
(Continued)

coating that is applied to a wall face of the hub formation portion that is configured to form an outer peripheral face of the hub.

8 Claims, 11 Drawing Sheets

(51) Int. Cl.
    *B29C 45/00*     (2006.01)
    *B29K 69/00*     (2006.01)
    *B29C 45/37*     (2006.01)

(52) U.S. Cl.
    CPC ...... *B29C 45/37* (2013.01); *B29C 2045/0027* (2013.01); *B29C 2045/2709* (2013.01); *B29K 2069/00* (2013.01)

(56) References Cited

U.S. PATENT DOCUMENTS

| | | | |
|---|---|---|---|
| 7,600,710 B2 * | 10/2009 | Sumiya | B65H 75/30 242/332.4 |
| 2002/0175239 A1 * | 11/2002 | Momoi | G11B 23/107 242/348 |
| 2009/0057463 A1 | 3/2009 | Sumiya et al. | |

FOREIGN PATENT DOCUMENTS

| | | |
|---|---|---|
| JP | 2003-320552 A | 11/2003 |
| JP | 2008-049617 A | 3/2008 |
| JP | 2009-064506 A | 3/2009 |
| JP | 2010-215327 A | 9/2010 |

\* cited by examiner

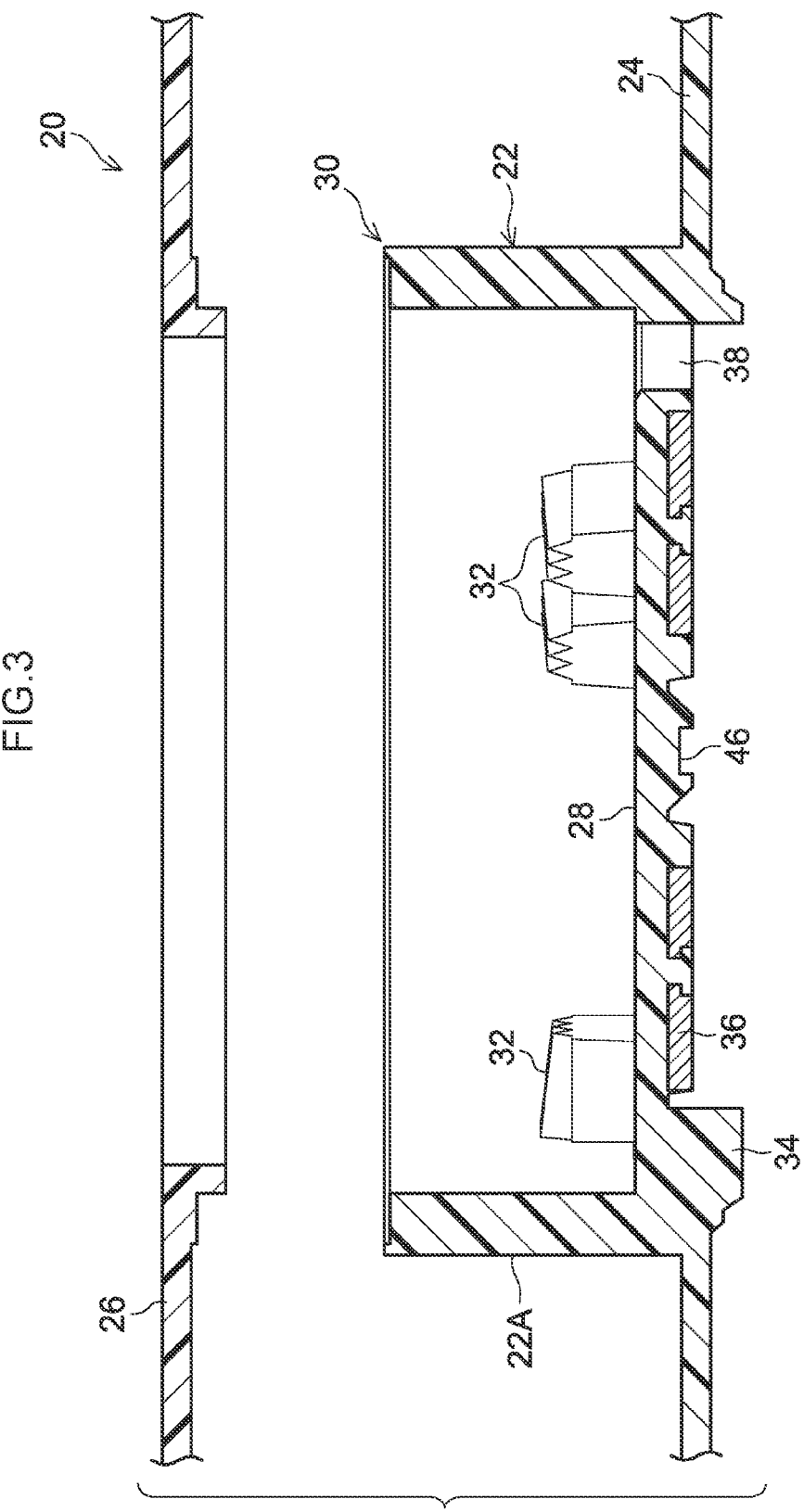

MOLD FOR MANUFACTURING REEL COMPONENT MEMBER, METHOD OF MANUFACTURING REEL COMPONENT MEMBER, AND METHOD OF MANUFACTURING REEL

CROSS-REFERENCE TO RELATED APPLICATION

This application claims priority under 35 USC 119 from Japanese Patent Application No. 2015-066198 filed Mar. 27, 2015, the disclosure of which is incorporated by reference herein.

BACKGROUND

Technical Field

Preferred embodiments relate to a mold for manufacturing reel component member, method of manufacturing reel component member, and method of manufacturing reel.

Related Art

Conventional tape cartridges are known in which a single reel, with a recording tape such as magnetic tape wound around an outer peripheral face of a hub, is housed inside a case. Conventional reels of such tape cartridges are also known in which a center line average roughness Ra of the outer peripheral face of the hub is stipulated to be from 0.005 µm to 0.04 µtm (see, for example, Japanese Patent Application Laid-Open (JP-A) No. 2003-30952).

Conventional winding methods are also known in which a free end portion of the recording tape is caused to make sliding-contact with the outer peripheral face of the hub, and the free end portion of the recording tape adheres to the outer peripheral face of the hub due to abraded powder that is generated as a result (see, for example, JP-A No. 2010-215327).

SUMMARY

However, in a case that reels are molded by a mold in which a gate as an injection inlet for melted resin material is, for example, disposed at a location that corresponds to a center portion of a bottom plate of the hub, three hole portions are sometimes formed at equal intervals around a circumferential direction at the bottom plate further to a radial direction inside than an inner peripheral face of the hub.

In such cases, the melted resin material that has been injected through the gate is divided by portions of the mold that form the hole portions, flows toward the radial direction outside, and converges at a portion of the mold that forms the hub.

Weld lines along the axial direction are therefore liable to be formed at an outer peripheral face of the hub positioned at the radial direction outside of the hole portions (see FIG. 7). A phenomenon is also seen in which portions of the mold facing the weld lines degrade over time. The cause of this phenomenon is thought to be as described below. Namely, when molding using the mold, corrosive gas generated by the melted resin flows in a manner similar to that of the melted resin, and so is liable to concentrate at portions formed by the weld lines (hereafter referred to as "weld portions"), and portions of the mold facing the weld lines sometimes corrode over time due to this corrosive gas.

When part of the mold corrodes, surface figure of the corroded portion is transferred to the outer peripheral face of the reel hub, such that the weld portions have a rougher surface than portions where the weld lines are not formed (hereafter referred to as "non-weld portions"). Thus, when the free end portion of the recording tape is caused to make sliding-contact with the outer peripheral face of the hub, in order to be adhered thereto, more abraded powder than required is generated at the weld portions.

In particular, recording tapes have become even thinner in recent years, such that, when the recording tape, with the free end portion adhered to the outer peripheral face of the hub, is wound around for a first turn, a second turn, a third turn, and so on, a step (creasing) of a thickness of the recording tape or greater, that cannot be ignored, occurs in the recording tape from the second turn onward superimposed on the free end portion, due to abraded powder interposed between the free end portion and the outer peripheral face of the hub.

In a case that a step is generated in the recording tape that has been wound around the hub, when the recording tape is run while rotating the reel for a specific number of rotations, and the recording tape is recorded on or played back by a recording and playback head of a drive device, the behavior of the recording tape at the portion where the step has been generated changes suddenly, such that there is a concern that a recording defect or a playback defect (hereafter referred to as "drop-out") occurs.

An object of preferred embodiments is to obtain a mold for reel component member, a method of manufacturing the reel component member, and a method of manufacturing a reel capable of suppressing drop-out from occurring when recording on or playing back a recording tape using a recording and playback head.

A mold for manufacturing a reel component member of a first aspect according to the disclosures includes a hub formation portion configured to form a circular tube shaped hub for winding a recording tape around; a flange formation portion configured to form a flange integrally provided at one end portion of the hub; a bottom plate formation portion configured to form a bottom plate that is provided with a ring shaped reel gear at the one end portion or another end portion of the hub and that includes a plurality of hole portions provided at equal intervals on the reel gear; a gate that is disposed further to a radial direction inside than a wall face of the hub formation portion that is configured to form an inner peripheral face of the hub; and an anticorrosion coating that is applied to a wall face of the hub formation portion that is configured to form an outer peripheral face of the hub A mold for manufacturing a reel component member of a second aspect according to the disclosures includes a hub formation portion configured to form a circular tube shaped hub for winding recording tape around; a flange formation portion configured to form a flange integrally provided at one end portion of the hub; a bottom plate formation portion configured to form a bottom plate provided at the one end portion or another end portion of the hub; a plurality of gates that are disposed at equal intervals around a circumferential direction of the hub formation portion and further to a radial direction inside than a wall face of the hub formation portion that is configured to form an inner peripheral face of the hub; and an anticorrosion coating that is applied to a wall face of the hub formation portion that is configured to form an outer peripheral face of the hub.

A method of manufacturing a reel component member of a third aspect according to the disclosures includes preparing the mold for manufacturing a reel component member of the first aspect or the second aspect; and injecting melted resin material through the gate.

A method of manufacturing a reel of a fourth aspect according to the disclosures includes joining another flange facing the flange of the reel component member, manufactured by the method of manufacturing a reel component member of the third aspect, to the other end portion of the hub.

The disclosures are capable of suppressing drop-out from occurring when recording on or playing back a recording tape using a recording and playback head.

BRIEF DESCRIPTION OF THE DRAWINGS

Embodiments of the present invention will be described in detail based on the following figures, wherein:

FIG. 3 is an exploded side cross-section illustrating a reel component member and an upper flange of a reel according to a first exemplary embodiment;

DETAILED DESCRIPTION OF THE INVENTION

Detailed explanation follows regarding exemplary embodiments based on the drawings. First, brief explanation follows regarding a recording tape cartridge 10 that houses a single reel 20, and then explanation follows regarding the reel 20. Note that when a recording tape T is wound onto the reel 20 according to the present exemplary embodiments, the winding is performed by a winding method described in JP-A No. 2010-215327.

Figure 1:
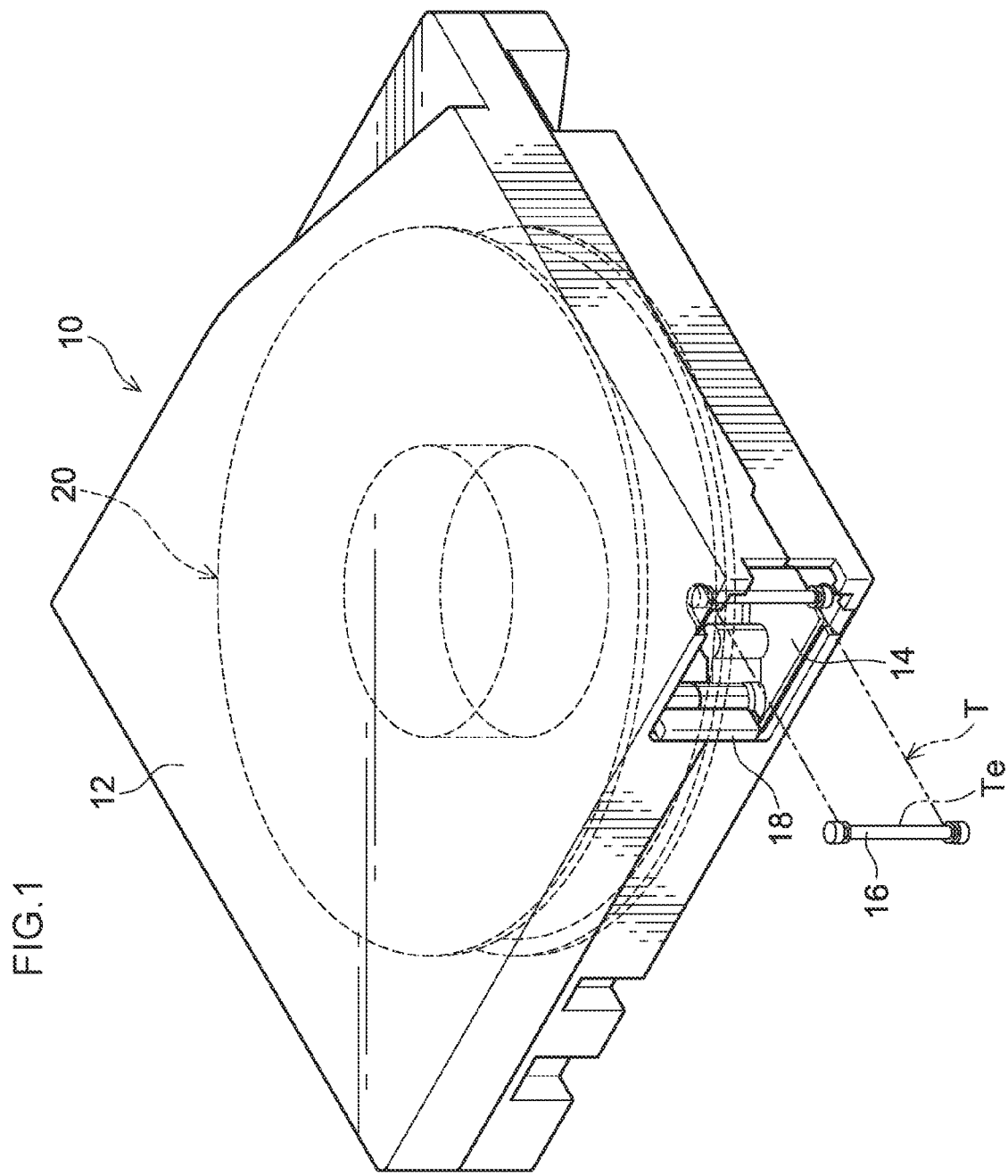
FIG. 1 is a perspective view of a recording tape cartridge.

As illustrated in FIG. 1, the recording tape cartridge 10 includes a case 12 made of a resin such as polycarbonate (PC). The case 12 is formed in a substantially rectangular box shape, and the single reel 20 made of a resin such as polycarbonate (PC) is housed alone so as to be capable of rotating at the inside of the case 12.

An opening 14 for pulling out the recording tape T that has been wound onto the reel 20 is formed at a side wall of the case 12. A leader pin 16, which is anchored and pull-operated by a pulling member (not illustrated in the drawings) of a drive device (not illustrated in the drawings), is fixed to a free end portion Te of the recording tape T that is pulled out from the opening 14.

The opening 14 is opened and closed by a door 18. The door 18 is formed in a substantially rectangular plate shape of a size capable of closing the opening 14, and is biased in a direction that closes the opening 14 by a biasing member (not illustrated in the drawings). The door 18 is opened against the biasing force of the biasing member as the recording tape cartridge 10 is mounted onto the drive device.

First Exemplary Embodiment

Figure 2A:
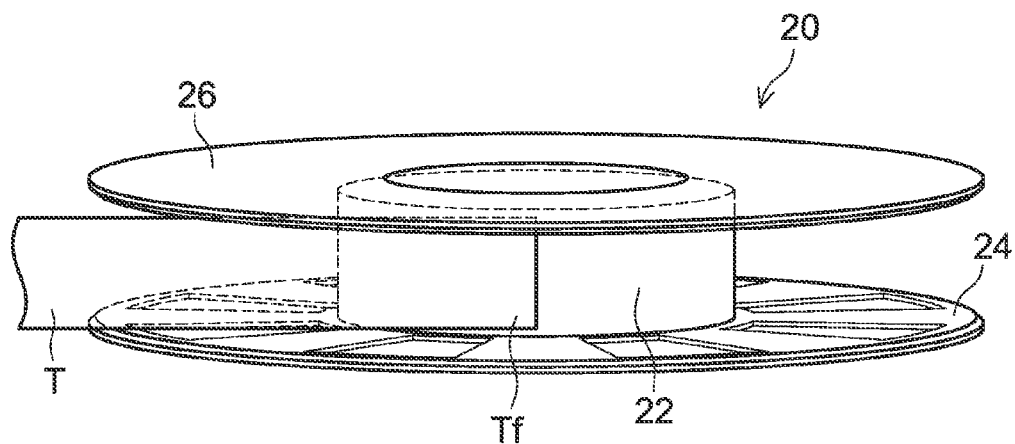
FIG. 2A is a perspective view of when a recording tape starts winding around a reel.

Explanation follows regarding the reel 20 according to a first exemplary embodiment. As illustrated in FIG. 2A and FIG. 3, the reel 20 is configured by a circular tube shaped reel hub 22 that configures an axial center portion, a lower flange 24 serving as a flange that is integrally provided at a lower end portion of the reel hub 22, an upper flange 26 serving as a flange that is provided at and joined to an upper end portion of the reel hub 22, and a bottom plate 28 that is integrally provided so as to close the lower end portion of the reel hub 22.

Note that a reel component member 30 of the present exemplary embodiment is configured by the reel hub 22, the lower flange 24, and the bottom plate 28. The recording tape T, which is a magnetic tape or the like serving as an information recording and playback medium, is wound around an outer peripheral face 22A of the reel hub 22, and width direction end portions of the wound recording tape T are protected by the lower flange 24 and the upper flange 26 (see FIG. 2B).

Figure 4A:
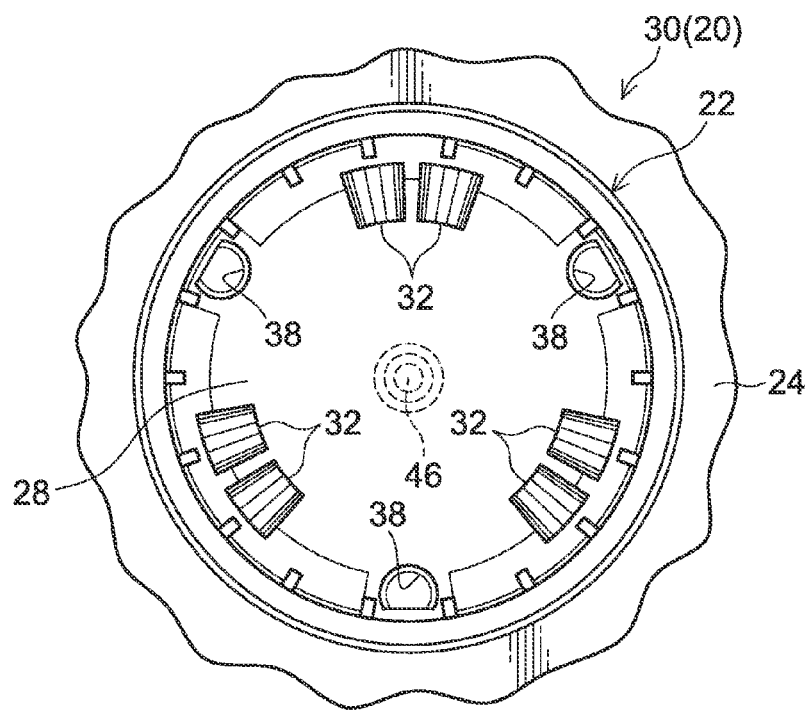
FIG. 4A is a plan view illustrating a configuration of a reel hub of a reel according to the first exemplary embodiment.

As illustrated in FIG. 3 and FIG. 4A, three engagement gears 32 are formed at equal intervals around a circumferential direction at an upper face of the bottom plate 28 further to a radial direction inside than an inner peripheral face of the reel hub 22. When the recording tape cartridge 10 is not mounted to the drive device and is not in use, the engagement gears 32 mesh with brake gears of a brake member (not illustrated in the drawings) that is incapable of rotating with respect to the case 12.

Figure 4B:
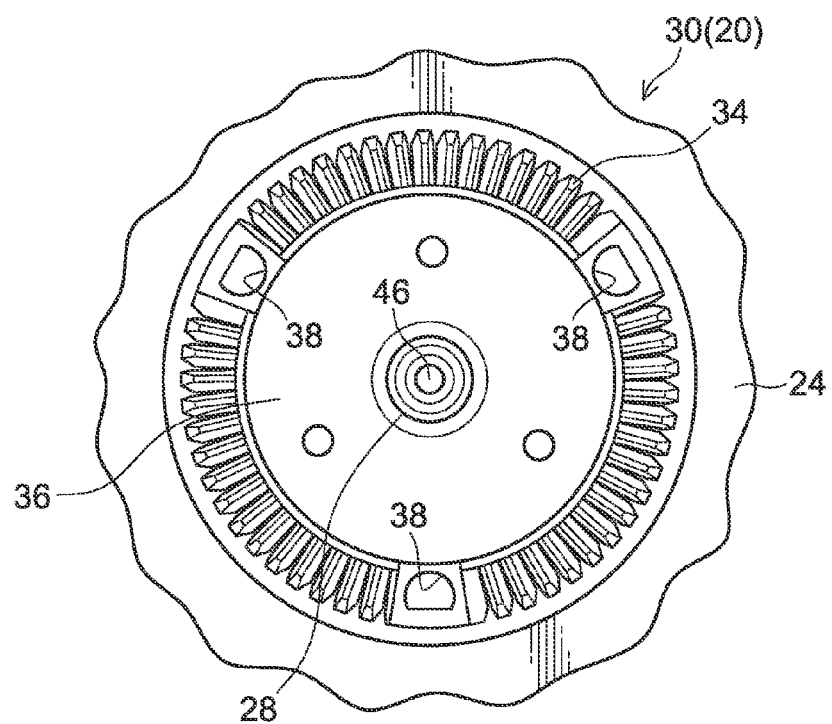
FIG. 4B is a bottom view illustrating a configuration of a reel hub of a reel according to the first exemplary embodiment.

As illustrated in FIG. 3 and FIG. 4B, a reel gear 34 is formed in a ring shape at a lower face of the bottom plate 28 further to the radial direction inside than the inner peripheral face of the reel hub 22. A ring shaped reel plate 36 formed of a magnetic material is integrally fixed by insert molding or the like to the lower face of the bottom plate 28, further to the radial direction inside than the reel gear 34.

Three hole portions 38 are formed at equal intervals on the reel gear 34. The three hole portions 38 are inserted with leg portions of a release member (not illustrated in the drawings) provided inside the reel hub 22 in order to release the braking of the reel 20 by the brake member,. A gate mark 46 is formed further to the radial direction inside than the reel plate 36, at a center portion of the bottom plate 28 (the axial center of the reel 20) in this example.

A gear opening (not illustrated in the drawings) to expose the reel gear 34 and the reel plate 36 to the outside is formed in substantially a center portion of a lower wall of the case 12. The reel gear 34 that is exposed through the gear opening is enmeshed with a drive gear (not illustrated in the drawings) formed at a rotary shaft (not illustrated in the drawings) of the drive device.

The enmeshing operation with the rotary shaft presses the leg portions of the release member toward the axial direction upper side, the release member presses the brake member upward toward the axial direction upper side, and releases the enmeshing of the brake gears with the engagement gears 32, such that braking on the reel 20 is released. The reel 20 which has been released from braking rotates inside the case 12 due to the rotary shaft being rotation-driven.

Winding Method

Figure 5A:
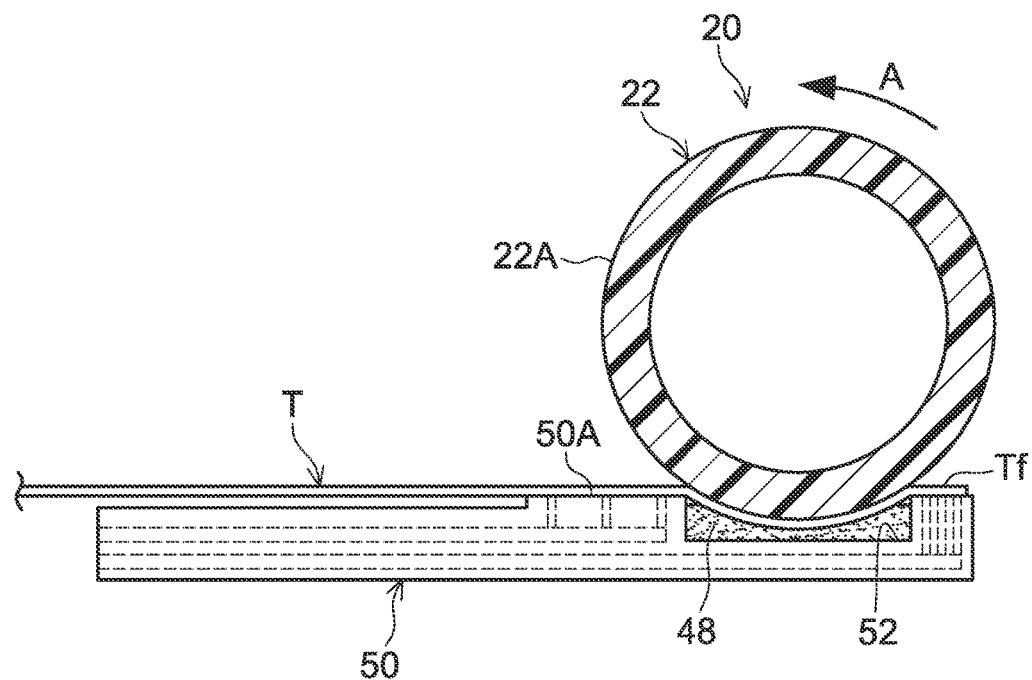
FIG. 5A is an explanatory view illustrating a state in which a recording tape retained by a retaining mechanism of a winding device has been pressed against a reel hub.
Figure 5B:
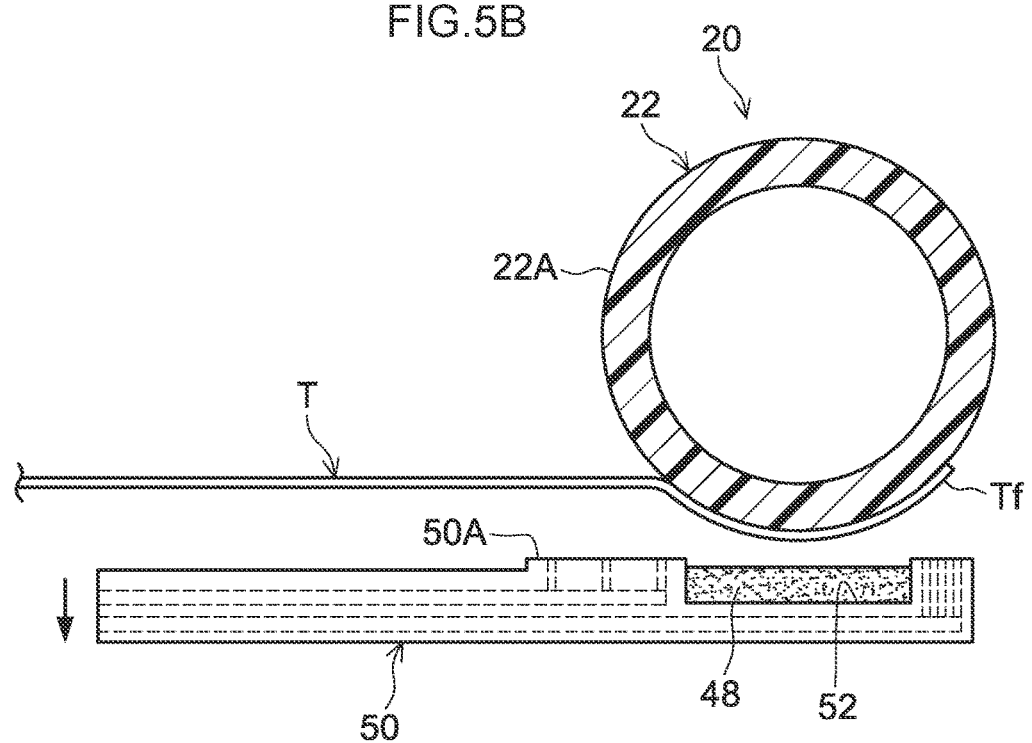
FIG. 5B is an explanatory view illustrating a state in which a retaining mechanism that has adhered a recording tape to a reel hub is separated from the reel hub.

Explanation follows regarding a winding method in which the recording tape T is adhered to and wound around the outer peripheral face 22A of the reel hub 22 in the reel 20 configured as described above, without being coated with a liquid for adhering. Note that FIG. 5A and FIG. 5B are plan view cross-sections illustrating only the reel hub 22 of the reel 20, in order to simplify the explanation of the drawings. A resilient body 48, described later, is configured by a sponge form material that has an appropriate hardness (such as hardness of 22 using a measuring method based on the Society of Rubber Industry, Japan Standard (SRIS) 0101).

As illustrated in FIG. 5A, the reel 20 is set on a rotary drive gear (not illustrated in the drawings) of a winding device. Namely, the reel gear 34 of the reel 20 is enmeshed with the rotary drive gear. Note that the reel plate 36 is attracted to a magnet (not illustrated in the drawings) provided at the radial direction inside of the rotary drive gear when this is performed.

A free end portion Tf, forming the opposite side of the recording tape T to the free end portion Te that is attached to the leader pin 16, is retained by air suction to an upper face 50A of a retaining mechanism 50 of the winding device. The resilient body 48 provided in a recessed portion 52 of the retaining mechanism 50 then presses the outer peripheral face 22A of the reel hub 22, with the free end portion Tf interposed therebetween.

Namely, the free end portion Tf of the recording tape T that is present on top of the resilient body 48 is caused to contact the outer peripheral face 22A of the reel hub 22 with a specific pressure. The reel hub 22 is then rotated for several seconds at a specific speed (such as 300 rpm) in the arrow A direction illustrated in FIG. 5A, and the outer peripheral face 22A of the reel hub 22 is caused to make sliding-contact with the recording tape T for a specific distance or more (such as 2000 mm or more). As illustrated in FIG. 5B, the free end portion Tf of the recording tape T adheres to the outer peripheral face 22A of the reel hub 22 when this is performed.

Note that adhesion force of the recording tape T is determined by a surface roughness Ra (nm) of a non-magnetic face, this being the contact face of the recording tape T (hereafter referred to as "back face Tb") contacting the outer peripheral face 22A of the reel hub 22, and the contact duration. Namely, in cases of a smooth face with Ra<approximately 5 nm, in which the surface roughness Ra of the back face Tb of the recording tape T is low, there is a large friction force against the outer peripheral face 22A of the reel hub 22, such that there is a large adhesion force (adhesion is easy). In such cases, the recording tape T thereby adheres to the reel hub 22 (outer peripheral face 22A), even if the contact duration (contact distance) thereto is short.

However, in cases of a rough face with Ra≥approximately 5 nm, in which the surface roughness Ra of the back face Tb of the recording tape T is high, there is a small friction force against the outer peripheral face 22A of the reel hub 22, such that there is a low adhesion force (adhesion is difficult). In such cases, the contact duration (contact distance) of the reel hub 22 (outer peripheral face 22A) against the recording tape T is thereby lengthened to increase the adhesion force. When the contact duration (contact distance) is lengthened, abraded powder D is generated at the back face Tb of the free end portion Tf (see FIG. 8, FIG. 9), and it is thought that the adhesion force against the reel hub 22 (outer peripheral face 22A) is increased by this abraded powder D.

Brief explanation regarding this mechanism follows below. An oxide film is formed at the outer peripheral face 22A of the reel hub 22. Thus, when the back face Tb of the recording tape T and the outer peripheral face 22A of the reel hub 22 (the oxide film) rub against each other in a pressed-together state, part of the oxide film is stripped away, and fine protrusions on the back face Tb are ground down. The abraded powder D is generated, and the abraded powder D adheres to the outer peripheral face 22A of the reel hub 22.

The abraded powder D is spread due to the sliding-contact of the reel hub 22 against the recording tape T, such that the bonding force of the abraded powder D is increased. In particular, surface energy rises at the outer peripheral face 22A where the oxide film has been stripped off, and the bonding force of the abraded powder D is increased. The abraded powder D with increased bonding force accordingly performs the role of an adhesive, thereby obtaining adhesion force of the recording tape T (free end portion Tf) against the outer peripheral face 22A of the reel hub 22.

Moreover, due to fine protrusions on the back face Tb of the recording tape T being ground down, the back face Tb is closer to being a smooth face, such that the friction force against the outer peripheral face 22A of the reel hub 22 is also increased. Thus, even in a recording tape T that has high surface roughness Ra (a rough face) of the back face Tb, adhesion force of the free end portion Tf against the outer peripheral face 22A of the reel hub 22 is increased, and the free end portion Tf adheres to the outer peripheral face 22A of the reel hub 22.

The free end portion Tf of the recording tape T is adhered to the outer peripheral face 22A of the reel hub 22 by the above mechanism, without using any liquid for adhering recording tapes, such as alcohol. Note that, when the free end portion Tf of the recording tape T has adhered to the outer peripheral face 22A of the reel hub 22, the air suction by the retaining mechanism 50 is released, and as illustrated in FIG. 5B, the retaining mechanism 50 is separated from the reel hub 22.

The rotary drive gear of the rotation mechanism is then rotated at a lower speed (such as 60 rpm) than the rotation speed during the above-described sliding-contact, while a specific tensile force (such as approximately 0.01N in cases in which the thickness of the recording tape T is 5.2 μm) is applied to the recording tape T. When a specific amount of the recording tape T has been wound around the reel hub 22, the rotary drive gear is then rotated at a high speed, and the recording tape T is sequentially wound onto the reel hub 22.

Figure 2B:
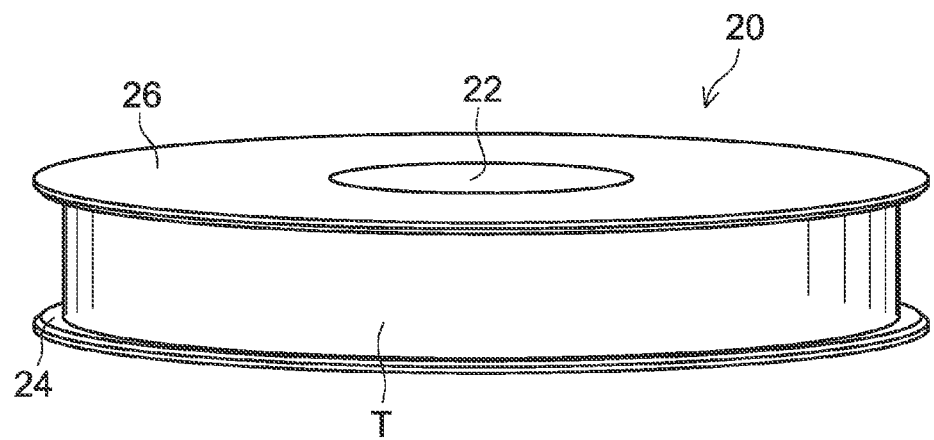
FIG. 2B is a perspective view of when a recording tape has finished winding around a reel.
Figure 8:
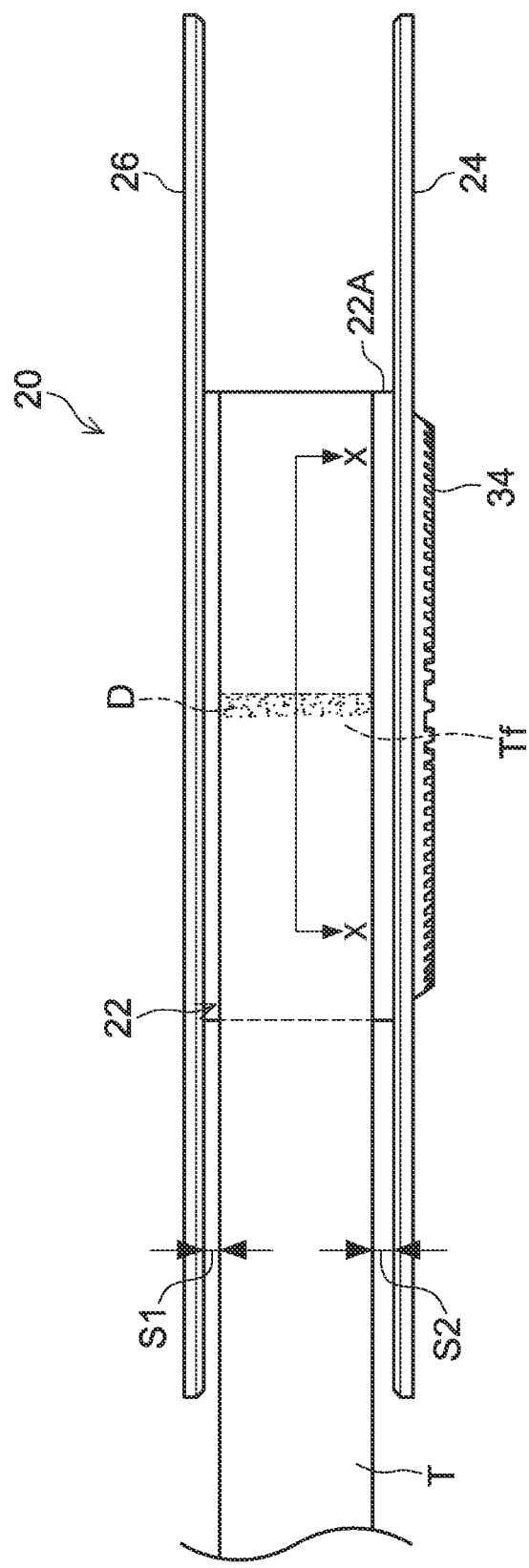
FIG. 8 is a side view illustrating a state in which one turn of a recording tape has been wound around a reel hub of a reel according to the first exemplary embodiment.

As illustrated in FIG. 2A and FIG. 2B, the reel 20 is thereby ultimately in a state with the recording tape T wound thereon. Note that, as illustrated in FIG. 8, when this winding method is employed, adhesion may be performed in a state in which specific gaps S1, S2 are respectively formed between edges of the recording tape T, and the lower flange 24 and the upper flange 26 (the recording tape T does not slope toward the lower flange 24 side or the upper flange 26 side).

Mold

Next, explanation follows regarding a mold 60 that integrally molds the reel hub 22, the lower flange 24, and the bottom plate 28 of the reel 20, namely, regarding configuration and operation of the mold 60 that molds the reel component member 30.

Figure 6:
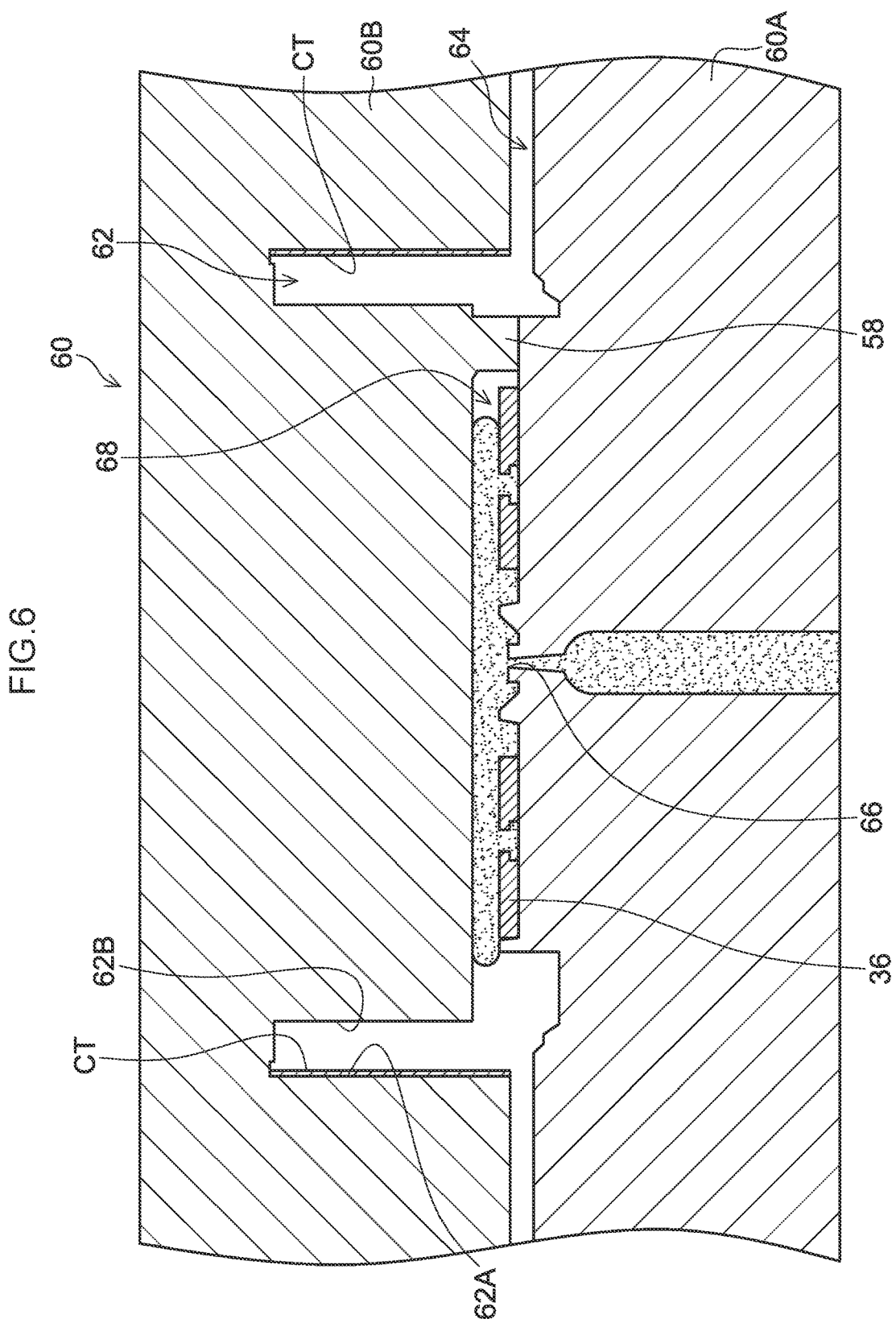
FIG. 6 is an enlarged cross-section illustrating a mold for molding a reel component member of a reel according to the first exemplary embodiment.

As illustrated in FIG. 6, the mold 60 includes a fixed side mold 60A and a movable side mold 60B, and a space for molding the reel component member 30 (respective formation portions, described later) by abutting the movable side mold 60B against the fixed side mold 60A. Explanation follows regarding the respective formation portions that form the reel component member 30.

The mold 60 is manufactured by steel or the like, and includes a hub formation portion 62 for forming the reel hub 22, a flange formation portion 64 for forming the lower flange 24, and a bottom plate formation portion 68 for forming the bottom plate 28. An anticorrosion coating CT is applied to a wall face 62A of the hub formation portion 62 that forms the outer peripheral face 22A of the reel hub 22.

A gate 66 for injecting melted resin material such as PC into the mold 60 is disposed further to the radial direction inside than a wall face 62B of the hub formation portion 62 that forms the inner peripheral face of the reel hub 22, and is disposed at a center portion of the bottom plate formation portion 68 (the axial center of the reel 20) in this example. Thus, when melted resin material is injected through the gate 66, the resin material flows from the bottom plate formation portion 68 toward the hub formation portion 62 and the flange formation portion 64.

Figure 7:
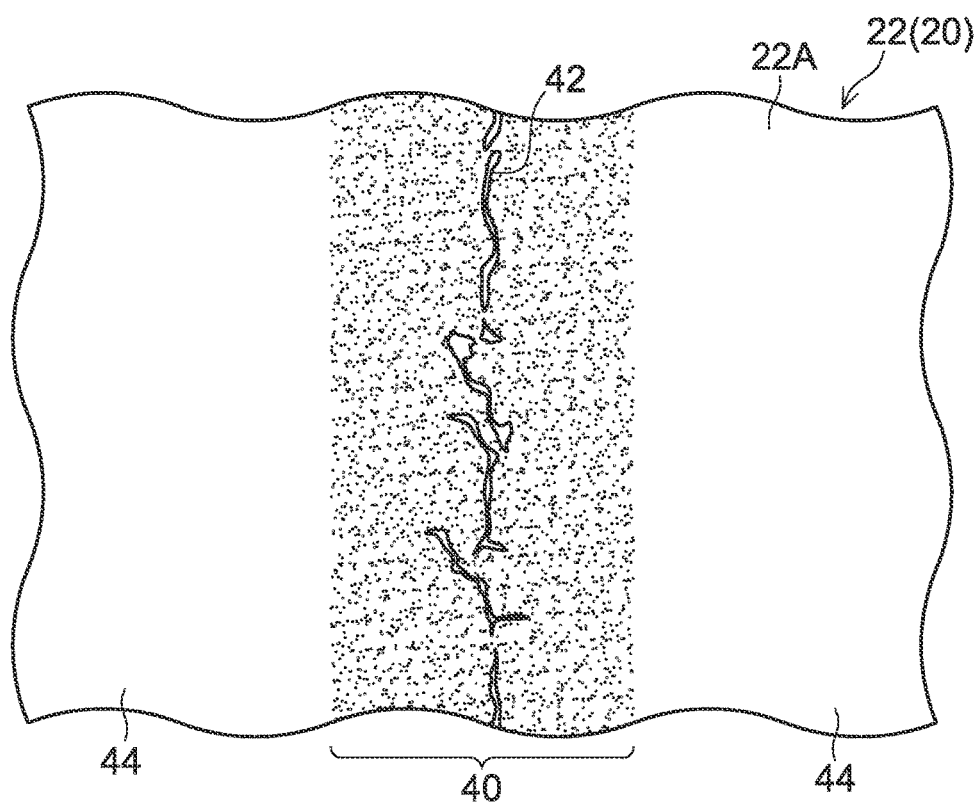
FIG. 7 is an enlarged side view illustrating a weld portion at an outer peripheral face of a reel hub of a reel component member that has been molded by a mold that is not coated with an anticorrosion coating.

Note that the three hole portions 38 are formed in the bottom plate 28 at equal intervals around the circumferential direction. Three column portions 58 are therefore provided at the bottom plate formation portion 68 at equal intervals around the circumferential direction. The resin material flowing from the bottom plate formation portion 68 toward the hub formation portion 62 side is temporarily divided by the respective column portions 58, and then converges inside the hub formation portion 62. As illustrated in FIG. 7, a weld line 42 that runs substantially along the axial direction is accordingly formed at the outer peripheral face 22A of the reel hub 22 at the radial direction outside of each hole portion 38 formed by the respective column portion 58.

During molding using the mold 60, corrosive gas is generated from the melted resin material. The corrosive gas flows in a similar manner to that of the melted resin material, and so is liable to concentrate at convergence portions of the resin material inside the hub formation portion 62. Thus, in cases in which the anticorrosion coating CT is not applied to the wall face 62A of the hub formation portion 62, it is conceivable that parts of the wall face 62A (locations facing the weld lines 42) corrode over time due to the corrosive gas, and that rough figure of these parts of the wall face 62A is transferred to the outer peripheral face 22A of the reel hub 22. Weld portions 40 including the weld lines 42 are thereby formed at equal intervals on three locations at the outer peripheral face 22A of the reel hub 22 (see FIG. 7).

Note that the recording tape T is wound onto the outer peripheral face 22A of the reel hub 22 using the above-described winding method; however, the surface is rougher at the weld portions 40 than at non-weld portions 44 that locates between each weld portion 40 and weld portion 40. Thus more abraded powder D than required is liable to be generated by the weld portions 40. Moreover, the recording tape T has a thickness of 5.5 µm or less (5.2 µm in the present exemplary embodiment) and 1000 m or more is wound around the reel 20, and there is a trend in the future that recording tapes will become even thinner.

Figure 9:
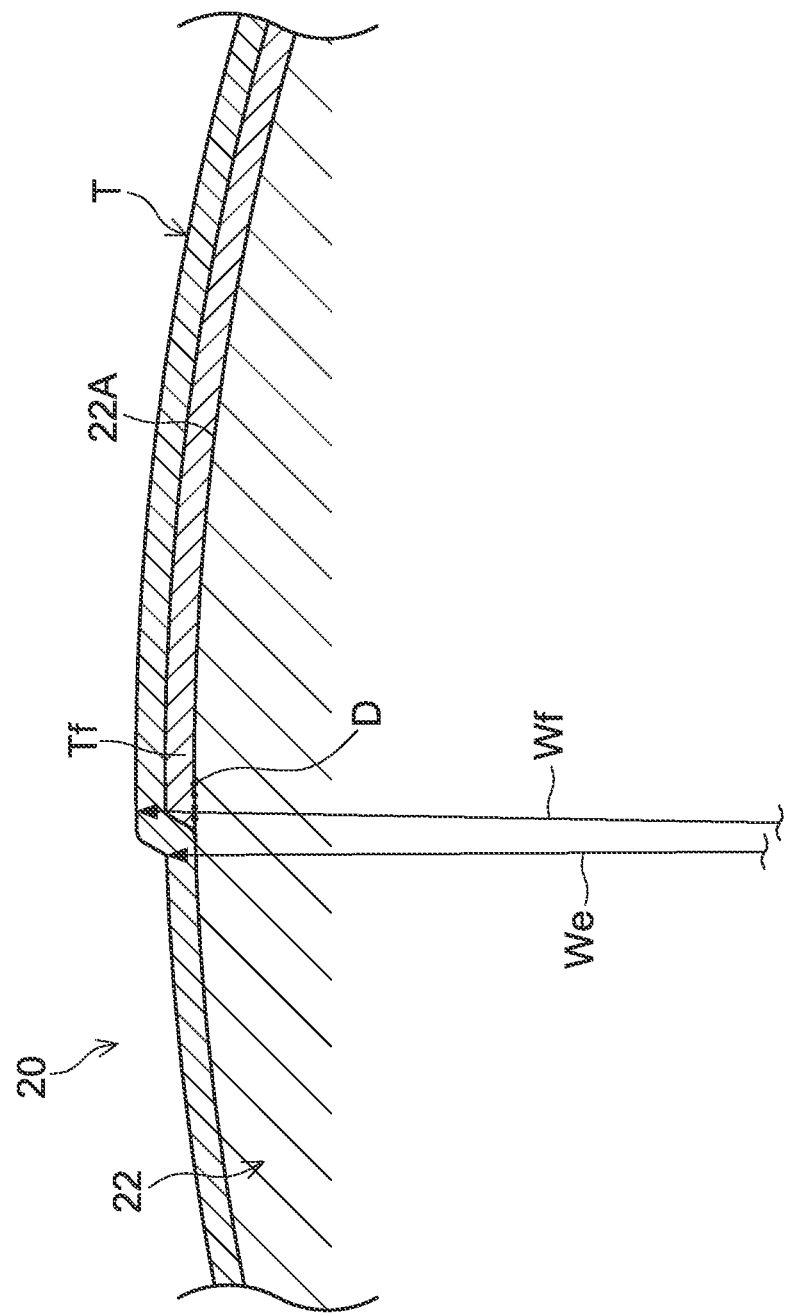
FIG. 9 is a cross-section taken along an arrow line X-X in FIG. 8.

Thus, as illustrated in FIG. 8 and FIG. 9, when the free end portion Tf of the recording tape T is adhered to the outer peripheral face 22A of the reel hub 22 by the abraded powder D, and a winding start portion of a second turn of the recording tape T is superimposed on and wound around the free end portion Tf of a first turn of the recording tape T with the abraded powder D interposed between the recording tape T and the outer peripheral face 22A, a step that has a thickness of the recording tape T or greater occurs at the winding start portion of the second turn of the recording tape T due to the abraded powder D, such that creasing is liable to occur in the recording tape T sequentially superimposed on the winding start portion.

in the event that creasing occurs in the recording tape T, when the recording tape T has been run while rotating the reel 20 for a specific number of rotations, and the recording tape T has been recorded on or played back by a recording and playback head (not illustrated in the drawings) of the drive device, the behavior of the recording tape T at the portion where the creasing has occurred changes suddenly, such that there is a concern a recording defect or a playback defect, namely, of drop-out occurring by the recording and playback head.

Note that, in the present exemplary embodiment as described above, in order to reduce the surface roughness Ra of the weld portions 40, the anticorrosion coating CT is applied to the wall face 62A of the hub formation portion 62 that forms the outer peripheral face 22A of the reel hub 22. Specifically, a chromium nitride-based coating, or a diamond-like carbon (DLC) coating, for example, is applied to the wall face 62A.

This enables the wall face 62A of the hub formation portion 62 of the mold 60 to be suppressed or prevented from corroding over time during molding, thereby enabling the surface roughness Ra of the weld portions 40 including the weld lines 42 at the outer peripheral face 22A of the reel hub 22 to be reduced. Specifically, a difference between the surface roughness Ra of the weld portions 40 and the surface roughness Ra of the non-weld portions 44 can be reduced to 0.25 µm, or less.

Thus, in the winding method in which the free end portion Tf of the recording tape T is wound on after being caused to make sliding-contact with and adhere to the outer peripheral face 22A of the reel hub 22, when the recording tape T is being wound around the outer peripheral face 22A of the reel hub 22, generation of more abraded powder D than required can be suppressed, and the step occurring due to the recording tape T being wound around can be reduced.

Specifically, obviously in cases of joining without employing the abraded powder D, but even in cases of joining employing the abraded powder D as illustrated in FIG. 9, a difference in winding radii We, Wf across the entire width of the recording tape T between a winding terminal end of the first turn and a winding start end of the second turn of the recording tape T that has been wound around the outer peripheral face 22A of the reel hub 22 is 1.3 times the thickness of the recording tape T, or less. Creasing can be suppressed or prevented from occurring on the recording tape T within this range, and drop-out can be suppressed or prevented from occurring. Moreover, since the degree to how much creasing occurs can be predicted, control that suppresses or prevents the occurrence of drop-out is possible.

Note that the anticorrosion coating CT is only applied to the wall face 62A of the hub formation portion 62. Namely, the anticorrosion coating CT is not applied to respective wall faces of the bottom plate formation portion 68 or the flange formation portion 64, which respectively mold the bottom plate 28 and the lower flange 24 which demand dimensional accuracy.

The surface roughness Ra and winding radius in the present exemplary embodiment is measured by a contour/form measuring system CV-3000CNC (manufactured by Mitutoyo Corporation). In the case of winding radius, for example, the surface of the recording tape T from the vicinity of the winding terminal end of the first turn to the vicinity of the winding start end of the second turn is scanned around the circumferential direction of the reel hub 22 at appropriate locations along the axial direction of the reel hub 22, and the difference in radii is derived from the acquired contour curve.

Second Exemplary Embodiment

Explanation follows regarding a reel 120 according to a second exemplary embodiment. Note that similar locations to the first exemplary embodiment are appended with the same reference numerals, and detailed explanation thereof including common operation is omitted as appropriate.

Figure 10A:
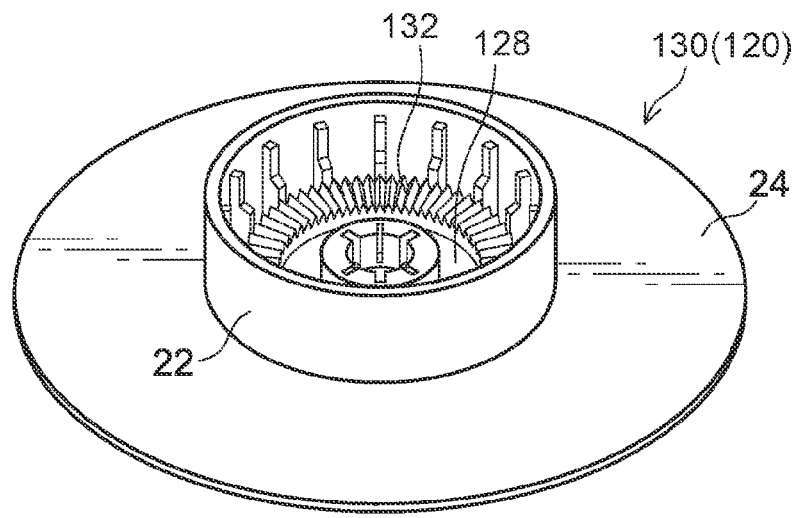
FIG. 10A is a perspective view illustrating a reel component member of a reel according to a second exemplary embodiment.
Figure 10B:
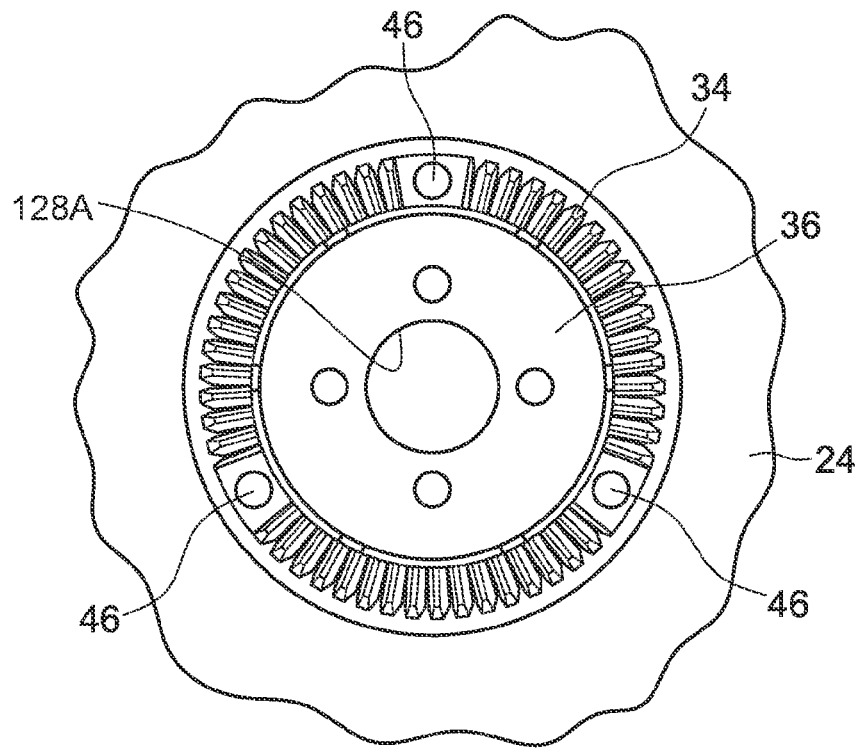
FIG. 10B is a bottom view illustrating a configuration of a reel hub of a reel according to the second exemplary embodiment.
Figure 11:
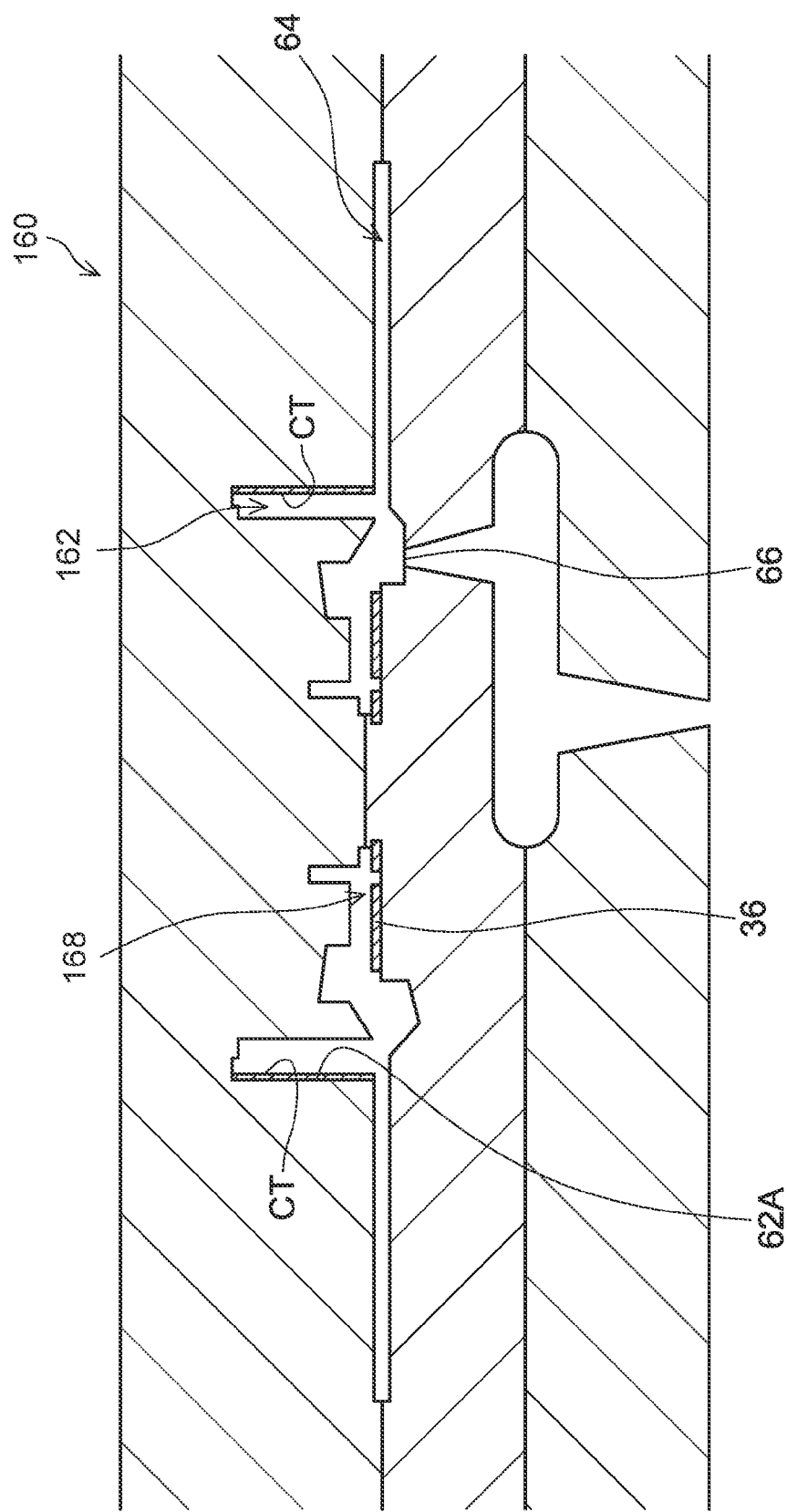
FIG. 11 is a cross-section illustrating a mold for molding a reel component member of a reel according to the second exemplary embodiment.

As illustrated in FIG. 10A and FIG. 10B, the reel 120 according to the second exemplary embodiment includes a circular shaped opening portion 128A at the center portion of the bottom plate 128 (the axial center of the reel 120), and three of the gate marks 46 are formed at equal intervals on the reel gear 34 formed at the lower face of the bottom plate 128. Namely, as illustrated in FIG. 11, in the mold 160 for molding the reel component member 130 of this reel 120, three of the gates 66 are disposed at equal intervals around the circumferential direction of the bottom plate formation portion 168.

Melted resin material that is injected through the three gates 66 thereby converges together at the bottom plate formation portion 168, and also converges together at the hub formation portion 162 and the flange formation portion 64. Thus, similarly to in the first exemplary embodiment, weld portions 40 each including the weld line 42 are formed at the outer peripheral face 22A of the reel hub 22 (see FIG. 7).

Namely, in the first exemplary embodiment, the weld portions 40 are formed at the outer peripheral face 22A of the reel hub 22 by the three column portions 58 provided at the bottom plate formation portion 68 at equal intervals around the circumferential direction, whereas in the second exemplary embodiment, the weld portions 40 are formed to the outer peripheral face 22A of the reel hub 22 by disposing the three gates 66 at the bottom plate formation portion 168 at equal intervals around the circumferential direction. Thus, as illustrated in FIG. 11, it is effective to apply the anticorrosion coating CT to the wall face 62A of the hub formation portion 162 of the mold 160 in this example also.

The molds 60 and 160 for the reel component members 30 and 130, the methods of manufacturing the reel component members 30 and 130, and the methods of manufacturing the reels 20 and 120 according to each of the present exemplary embodiments have been explained above based on the drawings. However, the mold 60 and 160, the methods of manufacturing the reel component members 30 and 130, and the methods of manufacturing the reels 20 and 120, according to each of the present exemplary embodiments are not limited to those illustrated, and the design may be modified as appropriate within a range not departing from the spirit of the present disclosure.

For example, the reel component member 30 configuring the reel 20 may be configured by the reel hub 22, the upper flange 26, and the bottom plate 28. Moreover, a configuration may be applied in which the anticorrosion coating CT is only applied to parts (locations facing the weld lines 42) of the wall face 62A of the hub formation portion 62. It is sufficient that there are plural of the hole portions 38, or the gate marks 46 and the gates 66, and the numbers thereof are not limited to the three illustrated in the drawings.

What is claimed is:

1. A method of manufacturing a reel, the method comprising:
   i) preparing a mold for manufacturing a reel component member, the mold comprising:
      a hub formation portion configured to form a circular tube shaped hub for winding a recording tape around;
      a flange formation portion configured to form a flange integrally provided at one end portion of the hub;
      a bottom plate formation portion configured to form a bottom plate that is provided with a ring shaped reel gear at the one end portion or another end portion of the hub and that includes a plurality of hole portions provided at equal intervals on the reel gear;
      a gate that is disposed further to a radial direction inner side from a wall face of the hub formation portion that is configured to form an inner peripheral face of the hub; and
      an anticorrosion coating that is applied to a wall face of the hub formation portion that is configured to form an outer peripheral face of the hub,
   ii) injecting melted resin material through the gate and manufacturing the reel component member; and
   iii) joining another flange facing the flange of the reel component member, to the other end portion of the hub,
   wherein the reel is configured such that a free end portion of a recording tape that has a thickness of 5.5 µm or less is caused to make sliding-contact with, and adhere to, the outer peripheral face of the hub, and the recording tape is wound around the outer peripheral face.

2. The method of manufacturing a reel of claim 1, wherein there are three of the hole portions at the bottom plate formation portion of the mold.

3. The method of manufacturing a reel of claim 1, wherein the anticorrosion coating is only applied to the wall face of the hub formation portion that is configured to form the outer peripheral face of the hub.

4. The method of manufacturing a reel of claim 1, wherein the anticorrosion coating is not applied to the flange formation portion.

5. A method of manufacturing a reel, the method comprising:
   i) preparing a mold for manufacturing a reel component member; the mold comprising:
      a hub formation portion configured to form a circular tube shaped hub for winding recording tape around;
      a flange formation portion configured to form a flange integrally provided at one end portion of the hub;
      a bottom plate formation portion configured to form a bottom plate provided at the one end portion or another end portion of the hub;
      a plurality of gates that are disposed at equal intervals around a circumferential direction of the hub formation portion and further to a radial direction inner side from a wall face of the hub formation portion that is configured to form an inner peripheral face of the hub; and an anticorrosion coating that is applied to a wall face of the hub formation portion that is configured to form an outer peripheral face of the hub, ii) injecting melted resin material through the gates and manufacturing the reel component member;

iii) joining another flange facing the flange of the reel component member, to the other end portion of the hub, wherein the reel is configured such that a free end portion of a recording tape that has a thickness of 5.5 μm or less is caused to make sliding-contact with, and adhere to, the outer peripheral face of the hub, and the recording tape is wound around the outer peripheral face.

6. The method of manufacturing a reel of claim 5, wherein there are three of the gates.

7. The method of manufacturing a reel of claim 5, wherein the anticorrosion coating is only applied to the wall face of the hub formation portion that is configured to form the outer peripheral face of the hub.

8. The method of manufacturing a reel of claim 5, wherein the anticorrosion coating is not applied to the flange formation portion.

* * * * *